(12) United States Patent
Davis et al.

(10) Patent No.: US 12,131,339 B2
(45) Date of Patent: Oct. 29, 2024

(54) SYSTEMS AND METHODS FOR ACTIVATING A POWER TOOL FOLLOWING A VERIFIED PURCHASE OF A POWER TOOL

(71) Applicant: Milwaukee Electric Tool Corporation, Brookfield, WI (US)

(72) Inventors: Anthony M. Davis, Brookfield, WI (US); Johnny Lienau, Glendale, WI (US); Timothy R. Obermann, Waukesha, WI (US); Chad E. Jones, Jackson, WI (US); Cory J. McCutchin, Menomonee Falls, WI (US); Kylie A. Petlak, Milwaukee, WI (US); Aaron Christopher Grode, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/693,437

(22) PCT Filed: Nov. 17, 2022

(86) PCT No.: PCT/US2022/050287
§ 371 (c)(1),
(2) Date: Mar. 19, 2024

(87) PCT Pub. No.: WO2023/096819
PCT Pub. Date: Jun. 1, 2023

(65) Prior Publication Data
US 2024/0265407 A1    Aug. 8, 2024

Related U.S. Application Data

(60) Provisional application No. 63/285,293, filed on Dec. 2, 2021, provisional application No. 63/282,474, filed on Nov. 23, 2021.

(51) Int. Cl.
*G06Q 20/20* (2012.01)
*B25F 5/00* (2006.01)
(Continued)

(52) U.S. Cl.
CPC ........... *G06Q 30/0185* (2013.01); *B25F 5/00* (2013.01); *G06Q 20/20* (2013.01); *H02J 7/0013* (2013.01);
(Continued)

(58) Field of Classification Search
CPC ...... G06Q 30/0185; G06Q 20/20; B25F 5/00; H02J 7/0013; H02J 7/0063; H02J 2207/10; H02J 2207/20
See application file for complete search history.

(56) References Cited

U.S. PATENT DOCUMENTS

| 10,701,561 | B1 * | 6/2020 | Sheffield | H04W 12/047 |
| 2002/0091573 | A1 * | 7/2002 | Hodes | G07F 17/42 705/17 |

(Continued)

FOREIGN PATENT DOCUMENTS

| CA | 2283552 | A1 * | 3/2001 | B25F 5/00 |
| CA | 2472304 | A1 * | 7/2003 | |

(Continued)

OTHER PUBLICATIONS

ISR and Written Opinion of related PCT/US2022/050287, mailed Apr. 11, 2023, 16 pages.

*Primary Examiner* — Ashford S Hayles
(74) *Attorney, Agent, or Firm* — Quarles & Brady LLP

(57) ABSTRACT

A power tool is provided that can include a body, a battery pack interface coupled to the body, an electronic controller coupled to the body, and a sled configured to engage with the battery pack interface. The sled can include a battery, and a boost converter electrically connected to the battery. An (Continued)

output of the boost converter can be configured to be electrically connected to the battery pack interface to provide a boosted voltage to the power tool.

16 Claims, 8 Drawing Sheets

(51) Int. Cl.
*G06Q 30/018* (2023.01)
*H02J 7/00* (2006.01)

(52) U.S. Cl.
CPC ......... *H02J 7/0063* (2013.01); *H02J 2207/10* (2020.01); *H02J 2207/20* (2020.01)

(56) References Cited

U.S. PATENT DOCUMENTS

| | | | | |
|---|---|---|---|---|
| 2003/0004889 A1* | 1/2003 | Fiala | ............... | G07F 7/025 |
| | | | | 705/64 |
| 2005/0133593 A1* | 6/2005 | Estakhri | ............... | G07F 7/02 |
| | | | | 235/382.5 |
| 2008/0264922 A1* | 10/2008 | Fosbinder | ............... | F02B 63/04 |
| | | | | 219/130.21 |
| 2011/0153441 A1* | 6/2011 | Smith | ............... | G06Q 30/0607 |
| | | | | 705/26.25 |
| 2014/0159919 A1* | 6/2014 | Furui | ............... | B25F 3/00 |
| | | | | 340/870.07 |
| 2015/0217422 A1* | 8/2015 | Esenwein | ............... | B25F 5/02 |
| | | | | 173/217 |
| 2015/0281235 A1* | 10/2015 | D'Argenio | ............... | G06F 21/34 |
| | | | | 726/7 |
| 2017/0050256 A1* | 2/2017 | Enyedy | ............... | B23K 9/10 |
| 2017/0110910 A1* | 4/2017 | Zeine | ............... | H02J 7/00047 |
| 2020/0090175 A1* | 3/2020 | Davis | ............... | G06F 21/71 |
| 2020/0265283 A1* | 8/2020 | Brotto | ............... | G06F 1/28 |

FOREIGN PATENT DOCUMENTS

| | | | | |
|---|---|---|---|---|
| CA | 2790564 A1 * | 6/2011 | ............. | G06Q 20/10 |
| DE | 102016201497 A1 | 8/2017 | | |
| EP | 3881975 A1 | 9/2021 | | |
| WO | WO-2013014914 A2 * | 1/2013 | ............... | B25F 3/00 |
| WO | 2020/033341 A1 | 2/2020 | | |

* cited by examiner

SYSTEMS AND METHODS FOR ACTIVATING A POWER TOOL FOLLOWING A VERIFIED PURCHASE OF A POWER TOOL

RELATED APPLICATIONS

The present application is a 371 application of PCT/US2022/050287 filed Nov. 17, 2022, which is based on and claims priority from U.S. Patent Application No. 63/282,474, filed on Nov. 23, 2021, and from U.S. Patent Application No. 63/285,293, filed on Dec. 2, 2021, the entire disclosure of each of which is incorporated herein by reference.

BACKGROUND

Work tools (e.g., power tools) allow operators to implement various functionalities on many different components or work pieces (e.g., electrical wires, power cables, sheet metal, wood, conduit, etc.). For example, some power tools can include a cutting head that is driven (e.g., hydraulically, or electrically) into a component, such as a power wire, to cut through the component. As further examples, other power tools include a chuck that retains a drill bit or driving bit and that is rotated (e.g., by a motor) to drill a hole or drive a fastener, include sanding pad that retains sandpaper and is oscillated, include a saw blade retainer that retains a saw blade and is reciprocated or rotated, or include various other actuatable components for performing other functions.

SUMMARY

Some embodiments of the disclosure provide a power tool system. The power tool system can include a power tool having a body, a battery pack interface coupled to the body, and an electronic controller coupled to the body. The power tool system may further include a sled configured to engage with the battery pack interface. The sled can include a battery, and a boost converter electrically connected to the battery. An output of the boost converter can be configured to be electrically connected to the battery pack interface to provide a boosted voltage to the power tool.

Some embodiments of the disclosure provide a method for activating a power tool following a verified power tool purchase. The method can include receiving, using a sled in communication with a power tool, a first signal from a point-of-sale device indicative of a valid purchase of the power tool, and based on receiving the first signal, boosting an output voltage of a battery of the sled, by a step-up voltage converter of the sled, to output a boosted voltage to a battery pack interface of the power tool.

Some embodiments of the disclosure provide a sled. The sled can include a housing, a battery, a wireless module, and a step-up voltage converter electrically connected to the battery. The sled can be configured to engage with a battery pack interface of a power tool. An output of the step-up voltage converter can be configured to be electrically connected to the battery pack interface to provide a boosted voltage to the power tool.

Some embodiments of the disclosure provide a method for activating a power tool. The method includes reading, by a point-of-sale (POS) electronic controller, a password from the power tool; performing, by the POS electronic controller, a translation function on the password to generate a translated password; transmitting, by the POS electronic controller, the translated password to the power tool, the power tool having a pre-stored copy of the translated password; and transmitting an activation code to the power tool that, in conjunction with the translated password, unlocks the power tool.

Some embodiments of the disclosure provide a point-of-sale (POS) device for activating a power tool. The POS device includes a communication interface and a point-of-sale (POS) electronic controller coupled to the communication interface. The POS electronic controller is configured to: read a password from the power tool; perform a translation function on the password to generate a translated password; transmit, via the communication interface, the translated password to the power tool, the power tool having a pre-stored copy of the translated password; and transmit, via the communication interface, an activation code to the power tool that, in conjunction with the translated password, unlocks the power tool.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
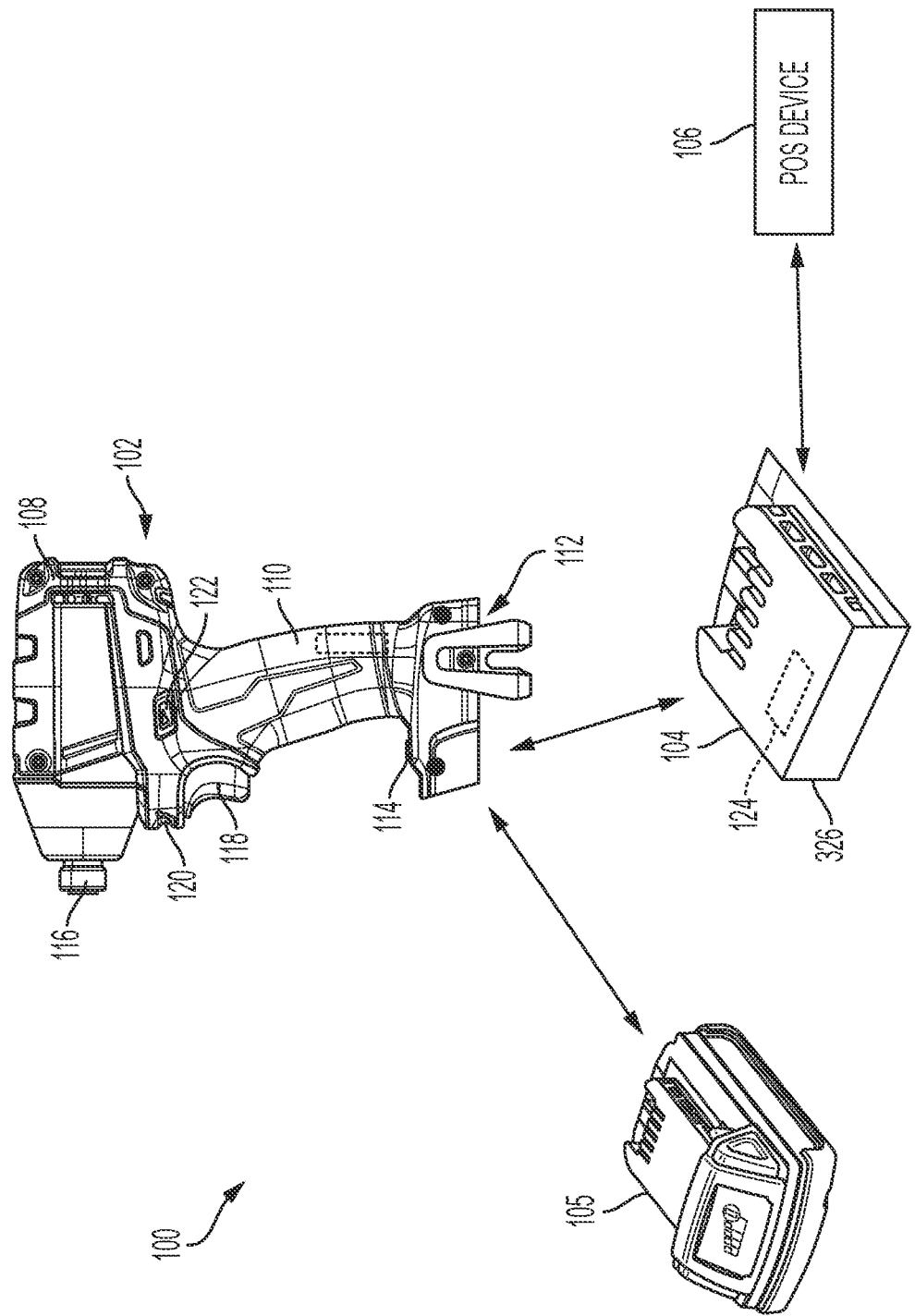
FIG. 1 is a schematic illustration of an anti-theft system.

As described above, power tools can generally implement various functionalities on different components or workpieces. For example, power tools can include an actuator including a moveable component that when moved into contact with the component, implements some kind of functionality on the component. For example, such as when the power tool is implemented as a cutting tool, the actuator of the cutting tool can include a cutting head that can, when moved into contact with a work piece (e.g., a wire to be cut) sever the work piece in two. As another example, such as when the power tool is implemented as a crimping tool, the actuator of the crimping tool can include a crimping head that can, when moved into contact with a work piece (e.g., a wire to be crimped), crimp the work piece (e.g., to create an electrical connection to the wire). As another example, such as when the power tool is implemented as a drill-driver, the actuator of the drill-driver can include a drill bit that can, when moved into contact with a work piece (e.g., apiece of wood), drill a hole in the workpiece. As another example, such as when the power tool is implemented as a drill-driver, the actuator of the drill-driver can include a driver bit that can, when moved into contact with a fastener (e.g., a screw) engaging a work piece (e.g., a piece of wood or metal), drive the fastener into the workpiece or remove the fastener from the workpiece, depending on the direction of rotation of the actuator. Power tools may also be provided in many different forms, such as sanders, reciprocating saws, jigsaws, circular saws, breakers, portable power supplies, worksite lights, nailers, grease guns, pipe cutter, and the like.

Some power tools can include an electronic controller that can control various features of the tool. For example, the electronic controller can drive extension (or rotation) of the actuator to implement a functionality on a work piece, or can drive retraction (or rotation in the opposing direction) of the actuator (e.g., after the functionality has been completed). In some cases, the electronic controller of the power tool can receive data from sensors of the power tool, which can augment the control of the actuator. For example, one sensor can be configured to sense actuation of a trigger that is coupled to the power tool and, when the sensor indicates to the electronic controller that the trigger is actuated (e.g., by an operator), the electronic controller causes the actuator to extend to implement the functionality.

In some cases, power tools (e.g., especially those that are valuable including large hydraulic power tools) can be stolen from a point-of-sale location such as a retail store. These instances of stealing can be a burden for retail stores, resulting in significant losses in revenue and extra personnel (and other anti-theft) resources to attempt to thwart stealing of these power tools. To address this problem, after a verified purchase of the power tool, a wireless device (e.g., owned by the retail store) may communicate with a wireless module of the power tool to instruct the wireless module to transmit an unlocking command to an electronic controller of the power tool. However, because the wireless module may continuously scan for requests or responses from the wireless device and/or the power tool, the wireless module may drain a battery powering the wireless module. If the battery is drained before a valid purchase, the battery may need to be replaced and/or the wireless module may not be powered and able to effect the unlocking at the point of a verified purchase. In addition, power tools without such a wireless module could not be locked and unlocked using these techniques, leaving these power tools at risk of theft.

Some embodiments described herein provide solutions to these problems (and others) by providing improved systems and methods for activating a power tool following a verified purchase of a power tool. For example, some embodiments of the disclosure provide an anti-theft system that can include a power tool having a battery pack interface, a sled having a power source (e.g., a battery), and a point-of-sale device that can communicate with the sled. The sled can be engaged with the battery pack interface of the power tool, which can electrically connect the sled to the battery pack interface. For example, the sled can provide power (e.g., from the power source) to the battery pack interface to power an electronic controller of the power tool, and can electrically connect a processor of the sled to the electronic controller of the power tool. By utilizing the battery pack interface, the sled can be universal for all power tools having a similarly structured battery pack interface. In this way, the power tools do not have to be redesigned or restructured to accommodate the sled (e.g., the hardware of the power tools can remain the same), and in fact, this sled can expand the use of anti-theft verification for other power tools that were previously not intended to include anti-theft verification (e.g., lower cost power tools). In addition, the engagement between the sled and the battery pack interface allows for the sled to be positioned outside of the housing, which can facilitate easier disengagement between the sled and the power tool. In this way, the sled can be easily disposed (e.g., after a verified purchase) or replaced (e.g., if the battery of the sled is completely drained prior to a verified purchase).

In some embodiments, the positioning of the sled and engagement with the battery pack interface of the power tool can allow for the sled to accommodate a larger battery (e.g., as compared to previous configurations in which a wireless module was placed in the housing of the power tool). In addition, because there is wired communication between the sled and the power tool (e.g., via the battery pack interface) the sled does not have to continuously scan for communication with the power tool. In this way, the sled can better conserve battery resources thereby extending the life of the battery of the sled (e.g., because the sled is not transmitting wireless signals to the power tool). In some cases, the sled can include a step up voltage converter (e.g., a boost converter) to step up the nominal voltage of the battery of the sled to a boosted voltage sufficient to power the electronic controller of the power tool. In this way, the electronic controller of the power tool does not continuously drain the battery of the sled, but rather only drains the battery when the boost converter is activated thereby significantly increasing the battery life of the battery of the sled.

FIG. 1 shows a schematic illustration of an anti-theft system 100. The anti-theft system 100 can include a power tool 102, a sled 104, and a point-of-sale ("POS") device 106. The power tool 102 can be implemented in different ways. For example, the power tool 102 can include an actuator, an electronic controller, a power source interface (e.g., a battery pack interface) configured to be coupled to a power source (e.g., a battery pack 105), etc. As shown in FIG. 1, the power tool 102 is illustrated as an impact driver, however, the power tool 102 can be implemented to be other types of power tools including, for example, an impact driver, a power drill, a hammer drill, a pipe cutter, a sander, a nailer, a grease gun, a crimper, etc. The power tool 102 can include an upper main body 108, a handle 110, a battery pack interface 112, a mode pad 114, an output drive device 116, a trigger 118, a work light 120, and a forward/reverse selector 122. The housing of the power tool 102 (e.g., the main body 108 and the handle 110) can be composed of a durable and light-weight plastic material. The drive device 116 can be composed of a metal (e.g., steel), and can be a socket (or other structure specifically designed for the task associated with the particular power tool). The battery pack interface 112 can be configured to receive and couple to the battery pack 105, which can provide power to the power tool 102 (e.g., after the power tool 102 has been unlocked). The battery pack interface 112 can include a connecting structure to engage a mechanism that secures the battery pack 105 and a terminal block to electrically connect the battery pack 105 to the power tool 102. In some cases, the mode pad 114 allows a user to select a mode of the power tool 102 and can indicate to the operator of the power tool 102 the currently selected mode of the power tool 102.

As shown in FIG. 1, the sled 104 can include a power source 124, such as, for example, an electrical storage device (e.g., a battery). In some cases, the sled 104 can advantageously include a single battery cell (e.g., a coin cell, an AA battery, a D battery, etc.), which can ensure that the sled 104 takes up a smaller footprint. In some embodiments, the battery of the sled 104 can be a high-capacity battery, such as, for example, a lithium-ion battery, a nickel cadmium battery, a zinc-carbon battery, a zinc-chloride battery, etc., which can prolong usage of the sled 104. In some cases, the battery of the sled 104 can be rechargeable to facilitate reuse of the sled 104, or the battery of the sled 104 can be non-rechargeable so that, after use, the sled 104 can simply be disposed, recycled, etc. Although not shown in FIG. 1, the sled 104 can include a processor, a wireless module including a transceiver circuit (e.g., a Bluetooth® wireless module), a housing, a step-up voltage converter, and one or more electrical terminals (see, e.g., FIG. 3).

As shown in FIG. 1, the sled 104 can engage with the battery pack interface 112 of the power tool 102 to electrically connect the sled 104 to the battery pack interface 112 thereby electrically connecting the sled 104 to the power tool 102. For example, the one or more electrical terminals of the sled 104 can mate with one or more corresponding electrical terminals of the battery pack interface 112 to electrically connect the battery of the sled 104 to the battery pack interface 112, and to electrically connect the processor of the sled 104 to the battery pack interface 112. In this way, the battery of the sled 104 can provide power to the electronic controller (not shown) of the power tool 102 to turn on the electronic controller, and the processor of the sled 104 can communicate with the electronic controller of the power tool 102 via the battery pack interface 112 (e.g., to unlock the power tool 102). As described above, wired communication between the sled 104 and the electronic controller of the power tool 102 (via the battery pack interface 112) can be advantageous in that the sled 104 does not have to waste power by continuously scanning for (and transmitting) wireless signals to the power tool 102. In some configurations, when the sled 104 is engaged with the battery pack interface 112 of the power tool 102, a battery pack (e.g., the battery pack 105) cannot engage with the battery pack interface 112 of the power tool 102. Thus, in some cases, when the sled 104 is engaged with the battery pack interface 112, the power source 124 of the sled is the only power source (e.g., electrical power source) providing power to the power tool 102. In other words, with the sled 104 interfaced to the battery pack interface 112, the power tool 102 does not receive (and may not be able to receive) power from a power source other than the power source 124.

The POS device 106 can be associated with a point-of-salepoint-of-sale location of one or more power tools (including the power tool 102). For example, the POS device 106 can be associated with a retail store, a specific retail kiosk within the retail store, etc. The POS device 106 can be implemented in different ways. For example, the POS device 106 can be a computing device, which can include typical computing components, such as, a processor device, memory, communication systems, a display, inputs (e.g., a mouse, a keyboard, a touch screen, sensors, and the like), power sources, etc. In some cases, the computing device can take on a variety of specific forms including a desktop, a laptop, a mobile device (e.g., a tablet, or a smartphone), a server, etc. In some cases, the POS device 106 can include a computing device and other components such as, for example, a scanner (e.g., a barcode scanner) to scan barcodes or QR codes of products, a docking station for the power tool 102 engaged with the sled 104 (e.g., a tool cradle), etc. In some cases, the POS device 106 can wirelessly communicate (e.g., bidirectionally) with the sled 104. For example, the POS device 106 can also include a wireless module to transmit and receive wireless signals from the wireless module of the sled 104 (e.g., a Bluetooth® wireless module or a Wi-Fi wireless module). Similarly, the sled 104 also can include a wireless module to transmit and receive wireless signals from the wireless module of the sled 104 (e.g., a Bluetooth® wireless module or a Wi-Fi wireless module). However, in other cases, the POS device 106 and the sled 104 can communicate in a wired manner. For example, including when the POS device 106 includes a docking station, the power tool 102 with the sled 104 coupled thereto, can be engaged with the docking station to electrically connect the docking station to the sled 104. In this way, wired communication can be established between the sled 104 and the POS device 106, via the docking station, and so the sled 104 can lack a wireless module, which can facilitate further power conservation of the battery of the sled 104 leading to prolonged battery life. As another example, an operator can open the housing of the tool 102 to expose the sled 104, and electrically connect the POS device 106 to the sled 104 to facilitate wired communication therebetween. In some cases, including when the power tool 102 has been returned, the POS device 106 can cause the sled 104 to re-lock the power tool 102 (e.g., via a wired manner).

Regardless of the configuration of the POS device 106, the POS device 106 can cause the power tool 102 to unlock, via the sled 104. For example, the POS device 106 can transmit an instruction to the sled 104 via a wireless (or wired) communication link, and the sled 104 can, in response to receiving the instruction, cause the power tool 102 to unlock by communicating with the electronic controller of the power tool 102, via the battery pack interface 112. This process will be described in more detail below.

Figure 2:
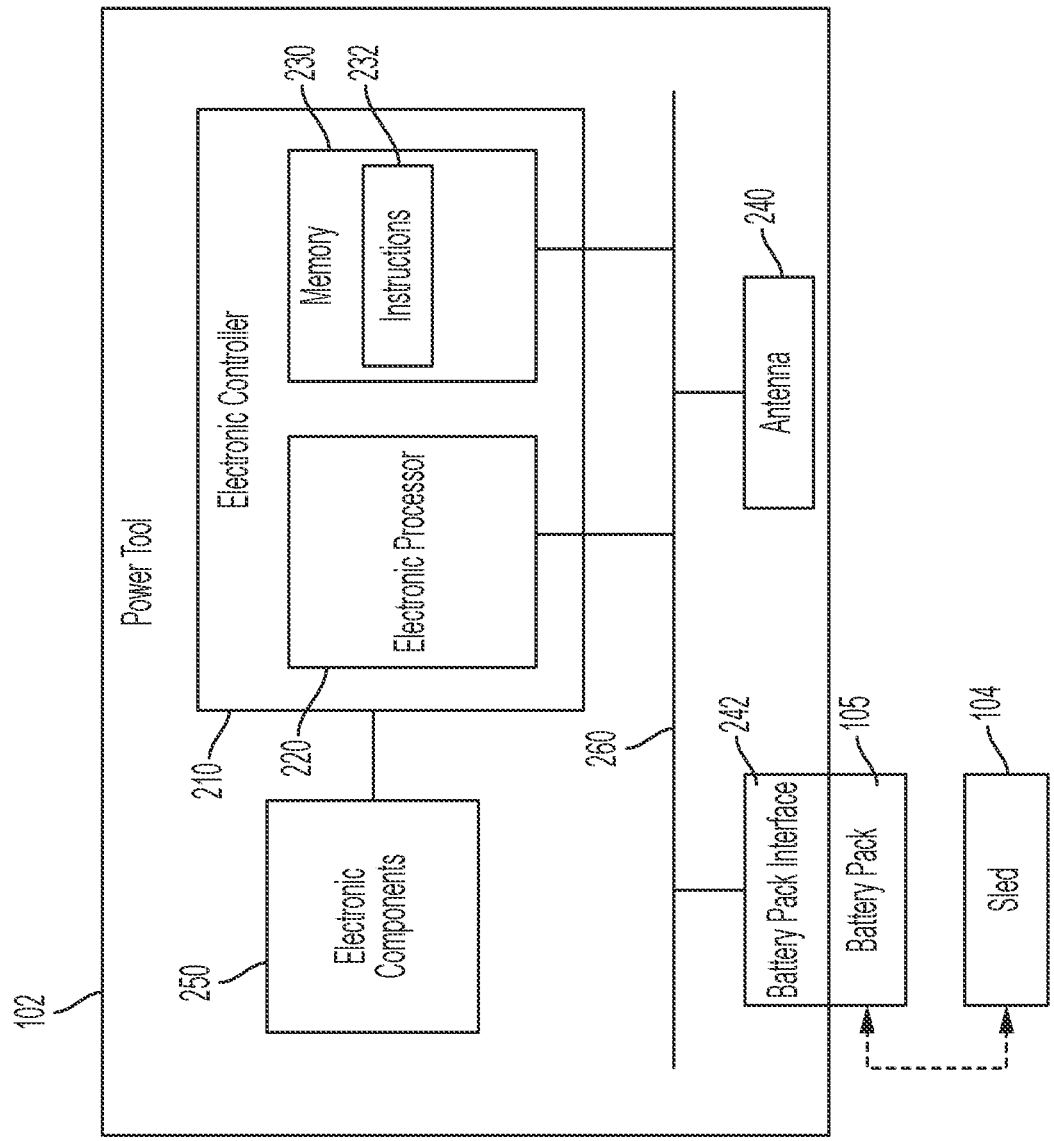
FIG. 2 shows a block diagram of a power tool.

FIG. 2 shows a block diagram an example of the power tool 102. In the example illustrated, the power tool 102 can include an electronic controller 210, an antenna 240, electronic components 250, etc. The electronic controller 210 can include an electronic processor 220 and a memory 230. The electronic processor 220, the memory 230, and the antenna 240 can communicate over one or more control buses, data buses, etc., which can include a device communication bus 260. The electronic processor 220 can be configured to communicate with the memory 230 to store data and retrieve stored data. The electronic processor 220 can be configured to receive instructions and data from the memory 230 and execute, among other things, the instructions. In particular, the electronic processor 220 executes instructions stored in the memory 230. Thus, the electronic controller 210 coupled with the electronic processor 220 and the memory 230 can be configured to perform the methods described herein (e.g., the process 400 of FIG. 5).

The memory 230 can include read-only memory (ROM), random access memory (RAM), other non-transitory computer-readable media, or a combination thereof. The memory 230 can include instructions 232 for the electronic processor 220 to execute. The instructions 232 can include software executable by the electronic processor 220 to enable the electronic controller 210 to, among other things, unlock the power tool 102.

The antenna 240 can be communicatively coupled to the electronic controller 210. The antenna 240 enables the electronic controller 210 (and, thus, the power tool 102) to communicate with other devices, such as a cellular tower, a Wi-Fi router, a mobile device, other power tools, etc. In some embodiments, the power tool 102 can include a power tool battery pack interface 242 (e.g., a specific implementation of the battery pack interface 112) that is configured to selectively receive and interface with the power tool battery pack 105 (or the sled 104 in place of the battery pack 105). The pack interface 242 can include one or more power terminals and, in some cases, one or more communication terminals that interface with respective power terminals, communication terminals, etc., of the power tool battery pack 105 (and of the sled 104). The power tool battery pack 105 can include one or more (e.g., multiple) battery cells of various chemistries, such as lithium-ion (Li-Ion), nickel cadmium (Ni-Cad), etc. The power tool battery pack 105 can further selectively latch and unlatch (e.g., with a springbiased latching mechanism) to the power tool 102 to prevent unintentional detachment. The power tool battery pack 105 can further include a pack electronic controller (pack controller) including a processor and a memory. The pack controller can be configured similarly to the electronic controller 210 of the power tool 102. The pack controller can be configured to regulate charging and discharging of the battery cells, and/or to communicate with the electronic controller 210. In some embodiments, the power tool battery pack 105 can further include an antenna, similar to the antenna 240, coupled to the pack controller via a bus similar to bus 260. Accordingly, the pack controller, and thus the power tool battery pack 105, can be configured to communicate with other devices, such as the cellular tower, the Wi-Fi router, the mobile device, or other power tools. In some embodiments, the memory of the pack controller can include the instructions 232. The power tool battery pack 105 can further include, for example, a charge level fuel gauge, analog front ends, sensors, etc.

The power tool battery pack 105 can be coupled to and configured to power the various components of the power tool 102, such as the electronic controller 210, the antenna 240, and the electronic components 250. However, to simplify the illustration, power line connections between the pack 105 and these components are not illustrated. In addition, the sled 104, which can be engaged with the battery pack interface 242 in place of the battery pack 105, can also provide power to some of the components of the power tool 102. For example, the battery of the sled 104 can be configured to provide power to the electronic controller 210 of the power tool 102, and in some cases, can be unable to sufficiently power other electronic components of the power tool 102, including, for example, the electronic components 250 (e.g., a motor, pump, lighting element, audio element, etc.).

In some embodiments, the power tool 102 can also optionally include electronic components 250. For a motorized power tool (e.g., drill-driver, saw, etc.), the electronic components 250 can include, for example, an inverter bridge, a motor (e.g., brushed or brushless) for driving a tool implement, etc. For a non-motorized power tool (e.g., a work light, a work radio, ruggedized tracking device, etc.), the electronic components 250 can include, for example, one or more of a lighting element (e.g., an LED), an audio element (e.g., a speaker), a power source, etc. In some embodiments, the antenna 240 can be within a separate housing along with the electronic controller or another electronic controller, and that separate housing selectively attaches to the power tool 102. For example, the separate housing may attach to an outside surface of the power tool 102 or may be inserted into a receptacle of the power tool 102. Accordingly, the wireless communication capabilities of the power tool 102 can reside in part on a selectively attachable communication device, rather than integrated into the power tool 102. Such selectively attachable communication devices can include electrical terminals that engage with reciprocal electrical terminals of the power tool 102 to enable communication between the respective devices and enable the power tool 102 to provide power to the selectively attachable communication device. In other embodiments, the antenna 240 can be integrated into the power tool 102.

Figure 3:
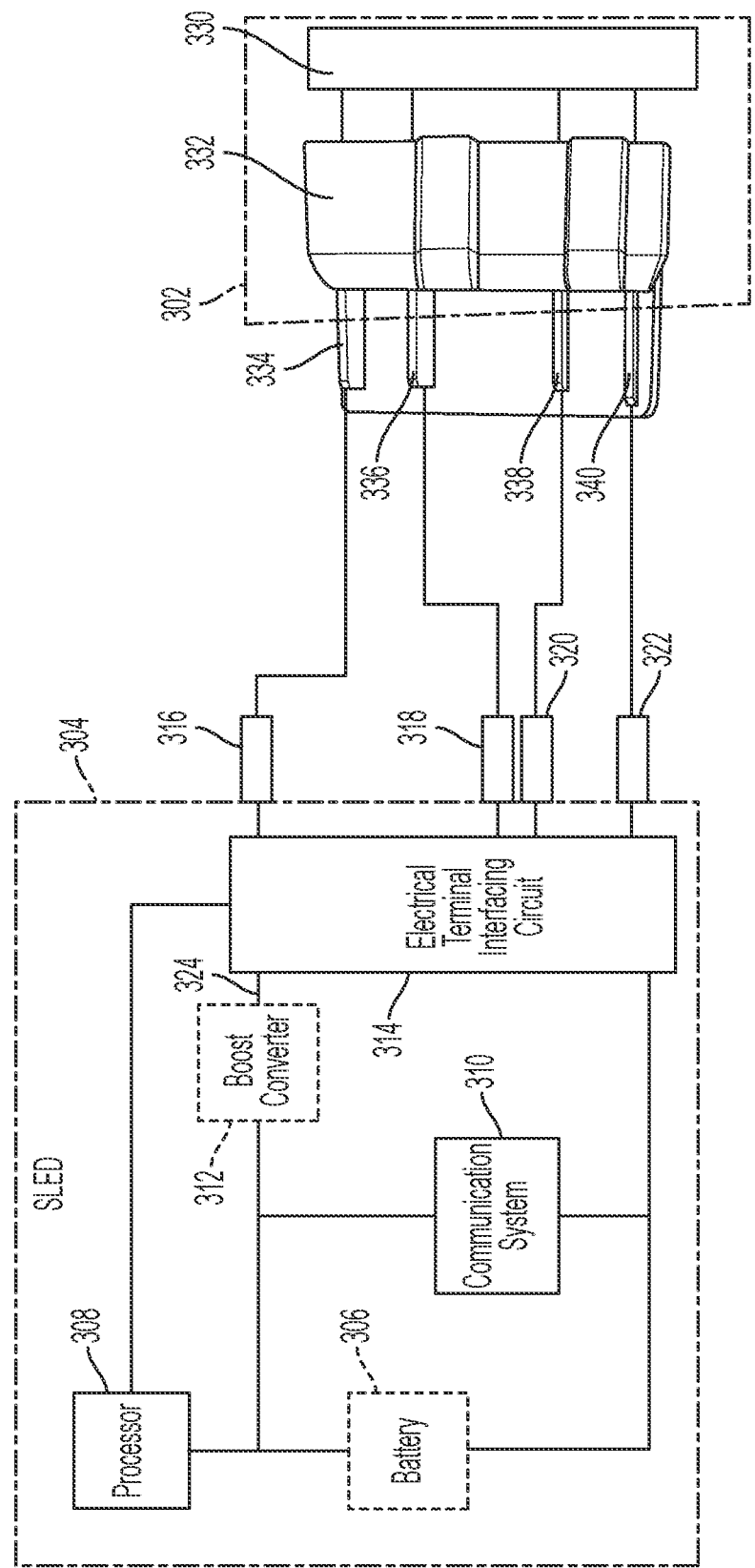
FIG. 3 shows a schematic illustration of a power tool and a sled.

FIG. 3 shows a schematic illustration of a power tool 302 and a sled 304. The sled 304 can be a specific implementation of the sled 104 and can include a battery 306, an electronic processor 308, a communication system 310, a step-up voltage converter 312, an electrical terminal interfacing circuit 314, and electrical terminals 316, 318, 320, 322. In some cases, the battery 306 is the only power source (e.g., only electrical power source) of the sled 304, which can include one or more battery cells arranged within a housing of the battery 306. The battery 306 can power some (or all) of the components of the sled 304 including, for example, the communication system 310, the electronic processor 308, the step-up voltage converter 312, and the electric terminal interfacing circuit 314, etc. In some cases, the battery 306 can be rechargeable (e.g., configured to be recharged), while in other cases, the battery 306 can be non-rechargeable (e.g., not configured to be recharged).

The electronic processor 308 can be implemented in different ways. For example, the electronic processor 308 can be implemented as one or more processor devices, (e.g., microcontrollers, field-programmable gate arrays, programmable logic controllers, logic gates, special purpose processor, etc.). In addition, the electronic processor 308 can also include other computing components, including memory, inputs, output devices, etc. (not shown). In this regard, the electronic processor 308 can be configured to implement some or all of the operations of the processes described herein, which can, as appropriate, be retrieved from memory. In some embodiments, the electronic processor 308 can include multiple control devices (or modules) that can be integrated into a single component or arranged as multiple separate components. In some cases, the electronic processor 308 can be in communication with some (or all) of the components of the sled 304, as appropriate. For example, the electronic processor 308 can be in communication (e.g., bidirectional communication) with the communication system 310, the step-up voltage converter 312, the electrical terminal interfacing circuit 314. In some examples, the electronic processor 308 and the communication system 310 are part of an integrated electronic controller.

The communication system 310 can be configured to facilitate communication between the sled 304 and a POS device (e.g., the POS device 106). For example, the communication system 310 can be a wireless communication module including a transceiver circuit with an antenna, such as a Bluetooth® wireless module (e.g., the BGM13S Bluetooth® wireless module made available by Silicon Labs, Austin TX, USA). Thus, the communication system 310 can include one or more antennas (e.g., a 2.4 GHz antenna, which can be utilized for receiving, transmitting, or both, wireless signals that can include Bluetooth® wireless signals). In some cases, the electronic processor 308 can be in communication with the communication system 310, so that the electronic processor 308 can wirelessly communicate with the POS device by using the communication system 310. In some configurations, including when the sled 304 does not include an antenna, the electronic processor 308 can be temporarily in electrical communication with the POS device. For example, one or more electrical terminals of the sled 304 (not shown) can engage with one or more corresponding electrical terminals of the POS device to (temporarily) bring the sled 304 in wired communication with the POS device. Then, wired communication between the sled 304 and the POS device can cease when the one or more electrical terminals of the sled 304 disengage with the corresponding one or more electrical terminals of the POS device.

In some embodiments, the step-up voltage converter 312 can be electrically connected to the battery 306 and can have an output 324 that can be electrically connected to a battery pack interface 332 of the power tool 302 to provide a boosted voltage to the electronic controller 330 of the power tool 302. In some cases, the step-up voltage converter 312 can be a boost converter (e.g., a DC-DC step-up voltage converter), while in other cases, the step-up voltage converter 312 can include an inverter (e.g., an DC to AC converter), a transformer with a first winding that receives the AC power from the inverter and a second winding that steps up the voltage provided to the first winding, and a rectifier (e.g., an AC to DC converter) electrically connected to the second winding that produces a DC voltage that is higher than the DC voltage provided to the inverter. Regardless of the configuration, the step-up voltage converter 312 can generate a higher DC voltage than output by the battery 306 and provide the higher DC voltage to the electronic controller 330 to turn on the electronic controller 330. For example, the battery 306 can have a first nominal voltage (e.g., the battery 306 may be configured to consistently produce a voltage at or near a first voltage value when the battery 306 has a state of charge at or above a low charge threshold), and the electronic controller 330 can be configured to be powered by a second nominal voltage that is higher than the first nominal voltage of the battery 306. Thus, by activating the step-up voltage converter 312 (e.g., causing a transistor of the step-up voltage converter 312 to turn on and off at a frequency), the output 324 of the step-up voltage converter 312 can provide a voltage (e.g., a DC voltage) that can power the electronic controller 330. Conversely, the first nominal voltage of the battery 306 is inadequate to directly power the electronic controller 330. In this way, power from the battery 306 can be conserved because the battery 306 cannot directly turn on the electronic controller 330, and thus the electronic controller 330 does not continuously drain the battery 306. In some embodiments, the nominal voltage of the battery pack (see, e.g., the battery pack 105 of FIG. 2) of the power tool 302 can be higher or substantially higher than the nominal voltage of the battery 306. In some embodiments, the step-up voltage converter 312 provides an output voltage that is more than two, three, five times, or ten times the first nominal voltage of the battery 306, or between two to fifteen, five to fifteen, or five to ten times the first nominal voltage of the battery 306. For example, the battery 306 may output a voltage of approximately 1.6 volts (e.g., within 5-15% of 1.6 volts), and the step-up voltage converter 312 may provide an output voltage of approximately 18 volts (e.g., within 5-15% of 18 volts), In other examples, the battery 306 provides a different first nominal voltage (greater than or less than 1.6 volts); the output voltage from the step-up voltage converter 312 is greater than or less than 18 volts; and the ratio of input to output voltage of the step-up voltage converter 312 is greater than or less than 1.6 V:18 V.

In some embodiments, the electrical terminal interfacing circuit 314, which can route (and actively change) the paths between the electrical terminals 316, 318, 320, 322. For example, the electrical terminal interfacing circuit 314 can be electrically connected to each of the electrical terminals 316, 318, 320, 322, and can include one or more switches for actively changing the electrical paths between electrical components of the sled 304 and the electrical terminals 316, 318, 320, 322. In other cases, however, the electrical terminal interfacing circuit 314 can be configured to reliably and repeatable route specific electrical components of the sled 304 to a respective electrical terminal 316, 318, 320, 322. For example, the electrical terminal 316 can be electrically connected to the output 324 of the step-up voltage converter 312, the electrical terminal 322 can be electrically connected to ground (or the negative terminal of the battery 306), the electrical terminal 318 can be electrically connected to the electronic processor 308, the electrical terminal 320 can be electrically connected to the electronic processor 308. In some cases, including when the sled 304 includes the electrical terminal interfacing circuit 314, the electrical terminals 318, 320 can each be electrically connected to the electrical terminal interfacing circuit 314, which can be electrically connected to the electronic processor 308 (e.g., to route electrical instructions to the terminals 318, 320, and receive data from the terminals 318, 320). Regardless of the configuration, each electrical terminal 316, 322 can be a power terminal, while each electrical terminal 318, 320 can be a communication terminal.

As shown in FIG. 3, the power tool 302 can include the electronic controller 330, and the battery pack interface 332 can include electrical terminals 334, 336, 338, 340. The power tool 302 is, in some cases, an example of the power tool 102 of FIGS. 1-2. Accordingly, in some cases, the electronic controller 330 is an example of the electronic controller 210 and the battery pack interface 332 is an example of the battery pack interface 242 and/or 112. In some cases, each electrical terminal 334, 340 can be a power terminal, while each electrical terminal 336, 338 can be a communication terminal. Each of the electrical terminals 334, 336, 338, 340 can be electrically connected to the electronic controller 330 as appropriate. For example, the electrical terminal 334 can be electrically connected to a power input (e.g., a Vin pin) of the electronic controller 330, the electrical terminal 340 can be electrically connected to ground input (e.g., a ground pin) of the electronic controller 330, the electrical terminal 336 can be electrically connected to a first communication port of the electronic controller 330, and the electrical terminal 338 can be electrically connected to a second communication port of the electronic controller 330. As shown in FIG. 3, the sled 304 can be electrically connected to the battery pack interface 332 (and thus electrically connected to the electronic controller 330), and can be electrically disconnected from the battery pack interface 332 (and thus electrically disconnected from the electronic controller 330). For example, the electrical terminals 316, 318, 320, 322 can interface respectively with the electrical terminals 334, 336, 338, 340, so that each electrical terminal 316, 318, 320, 322 electrically connects to the corresponding electrical terminals 334, 336, 338, 340. In this way, the electrical components of the sled 304 can selectively electrically connect to the electrical components of the battery pack interface 332, via engagement between the electrical terminals of the sled 304 and the battery pack interface 332.

In some embodiments, each electrical terminal 316, 318, 320, 322 can be a female connector (e.g., a socket), while each electrical terminal 334, 336, 338, 340 can be a male connector (e.g., a pin). However, in other configurations, each electrical terminal 316, 318, 320, 322 can be a male connector, while each electrical terminal 334, 336, 338, 340 can be a female connector. Regardless of the configuration, the sled 304 can be slid into engagement with the battery pack interface 332 to couple the sled 304 to the battery pack interface 332 and to electrically connect the sled 304 to the battery pack interface 332 each via the engagement between the electrical terminals. Similarly, the sled 304 can be slid out of engagement with the battery pack interface 332 to decouple the sled 304 from the battery pack interface 332 and to electrically disconnect the sled 304 from the battery pack interface 332 each via the engagement between the electrical terminals. Thus, the sled 304 can be removably coupled to the battery pack interface 332.

Figure 4:
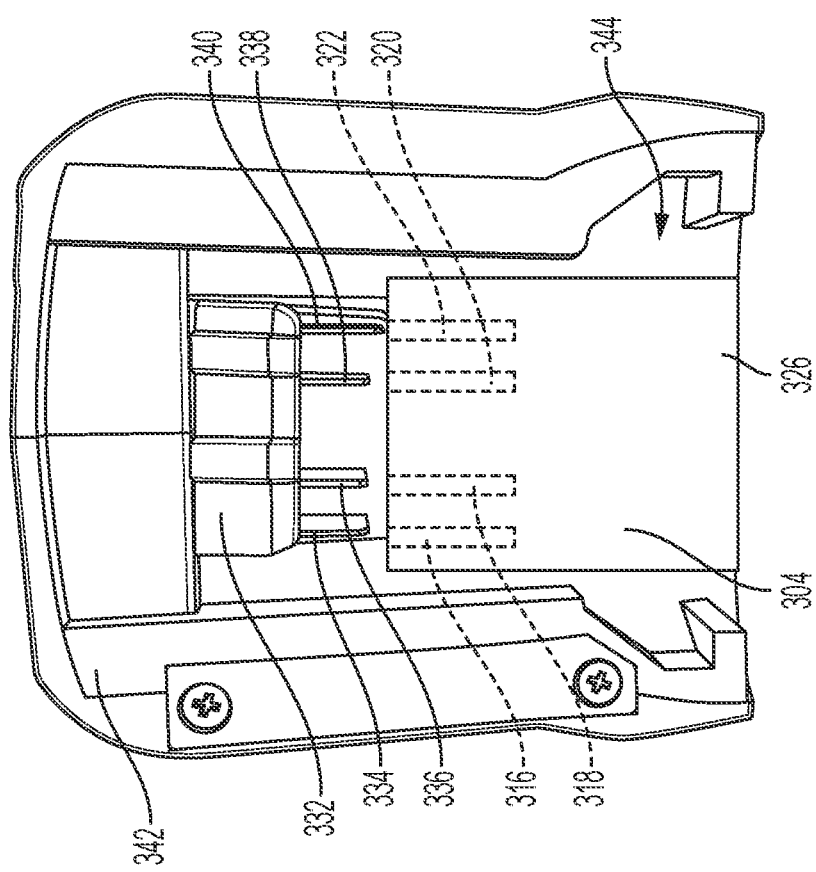
FIG. 4 shows a schematic illustration of the sled of FIG. 3 just prior to engagement with a battery pack interface of the power tool of FIG. 3.

FIG. 4 shows a schematic illustration of the sled 304 just prior to engagement (and electrical connection) with the battery pack interface 332. As shown in FIG. 4, some (or all) of the components can be coupled to or integrated within a housing 326 of the sled 304. For example, the battery 306, the electronic processor 308, the communication system 310, the step-up voltage converter 312, the electrical terminal interfacing circuit 314, the electrical terminals 316, 318, 320, 322, etc., can be coupled to (or integrated within) the housing 326. In some embodiments, such as single-use embodiments of the sled 304, the sled 304 does not include a housing and, for example, the components of the sled 304 are mounted on a printed circuit board that is exposed. Such an embodiment of the sled 304 may be lighter and use less material than embodiments with a housing. In some embodiments, the power tool 302 can include a body 342 with a recess 344. As shown in FIG. 4, the battery pack interface 332 can be coupled to the body 342 of the tool 302 and a portion (or the entire) battery pack interface 332 (e.g., including one or more of the electrical terminals 334, 336, 338, 340) can be positioned within the recess 344. Similarly, a portion (or the entire) sled 304 can be positioned within the recess 344 (e.g., when the sled 304 is engaged with the battery pack interface 332). In some cases, the entire sled 304 being positioned within the recess 344 can be advantageous in that such a configuration can mitigate debris, particles, etc., from undesirably interacting with the sled 304. In some cases, the recess 344 can be configured such that the entire sled 304 can be positioned within the recess 344 (e.g., when the sled 304 is engaged with the battery pack interface 332), while only a portion of the battery pack (e.g., the battery pack 105 of FIG. 1) is positioned within the recess 344 (e.g., when the battery pack is engaged with the battery pack interface 332, in place of the sled 304).

Figure 5:
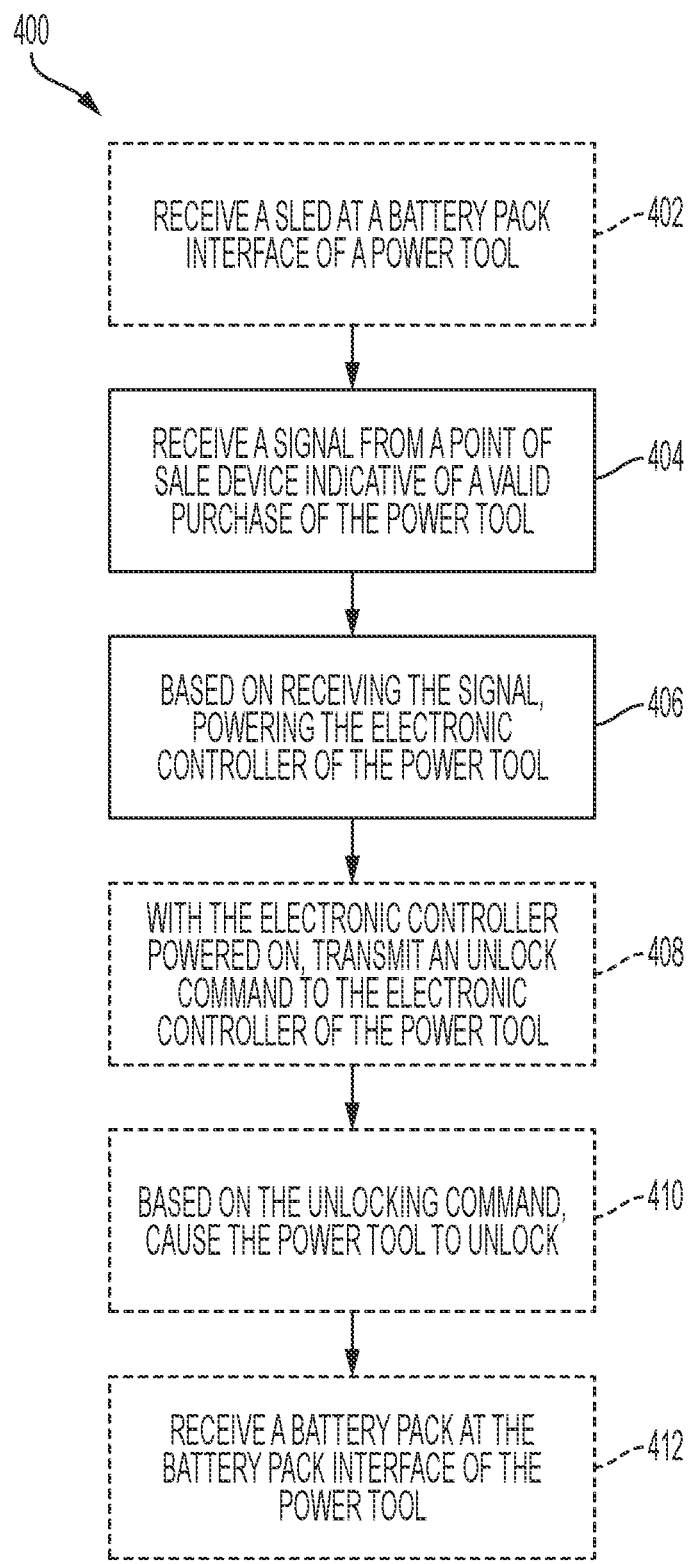
FIG. 5 shows a flowchart of a process for activating a power tool following a verified power tool purchase.

FIG. 5 shows a flowchart of a process 400 for activating a power tool (e.g., the power tool 102, 302) following a verified power tool purchase, which can be implemented using any of the systems described herein (e.g., the anti-theft system 100). However, in some embodiments, the process 400 can be implemented by another system having additional components, fewer components, alternative components, etc. Additionally, although the blocks of the process 400 are illustrated in a particular order, in some embodiments, one or more of the blocks can be executed partially or entirely in parallel, can be executed in a different order than illustrated in FIG. 5, or can be bypassed. For example, in some embodiments of the process 400, one or more of the blocks 402, 408, 410, and 412 are optional and may be bypassed. For illustration purposes, the process 400 is generally described as being implemented by the power tool 102 (and the sled 104) in the context of the anti-theft system 100 in FIG. 1. However, the process 400 may also be executed by the power tool 302 (and the sled 304), and, in other embodiments, other power tools can implement the process 400 as well.

In the block 402, the process 400 can include a power tool (e.g., the power tool 102) receiving a sled (e.g., the sled 104) at a battery pack interface (e.g., the battery pack interface 112, 242, or 332) of the power tool. Stated another way, in block 402, the sled may engage a battery pack interface of the power tool. For example, this engagement can include coupling the sled to the battery pack interface of the power tool, which can include sliding the sled until the sled engages with the battery pack interface. In some cases, this engagement can include electrically connecting the sled to the battery pack interface of the power tool (e.g., thereby electrically connecting the sled to an electronic controller of the power tool, via the battery pack interface). For example, with reference to FIGS. 3 and 4, this engagement can include engaging one or more electrical terminals of the sled (e.g., terminals 316, 318, 320, and/or 322) with one or more corresponding electrical terminals (e.g., terminals 334, 336, 338, and/or 340) of the battery pack interface.

In the block 404, the process 400 can include the sled receiving a signal (e.g., an activation signal) from a POS device (e.g., the POS device 106) indicative of a valid purchase of a power tool (e.g., the power tool). For example, this can include the POS device (e.g., a wireless communication device) transmitting the signal (e.g., a wireless signal, such as, for example, a Bluetooth® wireless signal) to and being received by the sled. A processor (e.g., the processor 308) of the sled may receive the wireless signal via a communications module (e.g., the communication system 310). The POS device may transmit the signal based on, for example, a user input (e.g., a retail kiosk user interfacing with the POS device). In some cases, the signal can be received as part of a wired communication between the POS device and the sled. For example, this can include the sled (or the POS device) establishing a wired communication link between the POS device and the sled (e.g., by the sled electrically connecting to the POS device), and the sled receiving the signal from the POS device, via the wired communication link.

In the block 406, the process 400 can include the sled powering the electronic controller (e.g., electronic controller 210 or 330) of the power tool. The sled may power the electronic controller based on the sled receiving the signal at the block 404. In some cases, this can include powering the electronic controller of the power tool from an off state to an on state. In some embodiments, the sled can cause a boosted voltage to be applied to the battery pack interface to power the electronic controller. For example, in response to receiving the signal of block 404, the processor of the sled (e.g., the processor 308) can activate a step-up voltage converter (e.g., the boost converter 312). The activated step-up voltage converter may receive a voltage signal output from a battery of the sled (e.g., the battery 306) at a first nominal voltage level and may boost that voltage signal to generate a boosted voltage at a second voltage level. The sled may then provide the boosted voltage to the battery pack interface (e.g., from the terminals 316, 322 to the terminals 334 and 340, respectively) to supply power to and turn on or activate the electronic controller of the power tool.

In the block 408, the process 400 can include the sled transmitting an unlock command to the electronic controller of the power tool (e.g., while the sled provides the boosted voltage to the electronic controller). In some cases, this can include establishing a wired communication link between the sled and the electronic controller of the power tool. For example, the sled may establish a wired communication link as part of block 402 when the sled and power tool engage one another, including when one or more communication electrical terminals of the sled (e.g., terminals 318 and 320) are connected with one or more corresponding communication electrical terminals of the electronic controller (e.g., terminals 336 and 338)). In some examples, establishing the wired commination link may also include executing a handshake protocol between the devices, which may include exchanging, transmitting, and/or receiving an identifier of a device that is communicating, providing communication protocol details (e.g., a clocks signal, a transmission rate), or the like. The sled (e.g., the processor 308 of the sled) may then transmit, and the electronic controller of the power tool may receive, the unlock command via the wired communication link.

In some embodiments, the unlock command can be or can include a passcode. In this case, the power tool (e.g., the electronic controller 210) can receive the passcode from the sled (e.g., via the battery pack interface). Then, the power tool (e.g., the electronic controller 210) can determine whether the received passcode matches a stored passcode (e.g., in a memory of the power tool, such as the memory 230). In this case, when the power tool determines that the received passcode matches the stored passcode, the power tool (e.g., the electronic controller 210) can proceed to the block 410 to cause itself to unlock (e.g., switch states from the locked state to the unlocked state). However, if the power tool determines that the received passcode is different than the stored passcode, the power tool can prevent the power tool from causing itself to unlock. In other words, the power tool can remain in the locked state. In some examples, the passcode is encrypted by the POS 106 or the sled and the power tool decrypts the (encrypted) passcode before comparing the (decrypted) passcode to the stored passcode.

In the block 410, the process 400 can include the electronic controller (e.g., the electronic controller 210) causing the power tool to unlock (e.g., based on the electronic controller receiving the unlock command at the block 408). For example, prior to the electronic controller of the power tool receiving the unlock command, the power tool can be in a locked state, in which the power tool is unable to rotate, translate, or otherwise drive the actuator of the power tool (for example, even when the power tool is coupled to a charged battery pack and the trigger of the power tool is pulled). However, when the electronic controller receives the unlock command from the sled, the electronic controller of the power tool can switch states from the locked state and to the unlocked state. In the unlocked state (e.g., when the power tool operates according to the unlocked state), the power tool can rotate, translate, or otherwise drive the actuator of the power tool, and can implement any other typical functions of the power tool (e.g., activating a light source of the power tool), as appropriate. In some embodiments, when the power tool operates according to the locked state, some (or all) of the functions of the power tool are prevented from being activated. For example, in the locked state, one or more of the electronic components of the power tool cease operation and/or are inhibited from operating (although the electronic controller may remain enabled for processing information and, for example, controlling the power tool to exit the locked state). In other words, in the locked state, one or more of the electronic components of the power tool are disabled from being operated by the electronic controller.

In some examples, the power tool includes a variable (e.g., a binary variable having its value stored in a memory of the electronic controller 210) indicative of whether the power tool is in an unlocked state or a locked state. The electronic controller 210 may invert or change the value of the binary value as part of the process to change from the unlocked state to the locked state, or vice versa. Additionally, in response to a request to actuate the power tool 102 (e.g., based on a trigger pull), the electronic controller 210 may access the variable and (1) when the variable indicates that the power tool is in an unlocked state, the electronic controller 210 carries out the requested actuation, and (2) when the variable indicates that the power tool is in a locked state, the electronic controller 210 ignores and does not implement the requested actuation. In some embodiments, the sled cannot provide a digital output that mimics that output or signature of a valid power tool battery pack. Accordingly, the power tool will not recognize the sled as a power tool battery pack. In some embodiments, the sled cannot provide a digital output that directly unlocks the power tool. In other words, the electronic controller unlocks the power tool, via instruction by the sled.

In the block 412, the process 400 can include the power tool receiving a battery pack (e.g., the battery pack 105, which may include multiple battery cells) at the battery pack interface of the power tool. For example, after unlocking the power tool (e.g., at the block 410), the process 400 can include removing the sled from engagement with the battery pack interface of the power tool. In some cases, this can include electrically disconnecting the sled from the battery pack interface (e.g., by removing one or more electrical terminals of the sled from engagement with one or more electrical terminals of the battery pack interface). Then, after the sled is decoupled (or otherwise removed) from engagement with the battery pack interface, the process 400 can include the power tool receiving the battery pack at the battery pack interface, which can include electrically connecting the battery pack to the battery pack interface of the power tool (e.g., so that the battery pack can supply current to the power tool).

In the case of the power tool not being successfully unlocked via the process 400 (e.g., when an invalid passcode or no unlock command is transmitted), the power tool may be prevented from operating even when the battery pack 105 is attached to the power tool.

Figure 6:
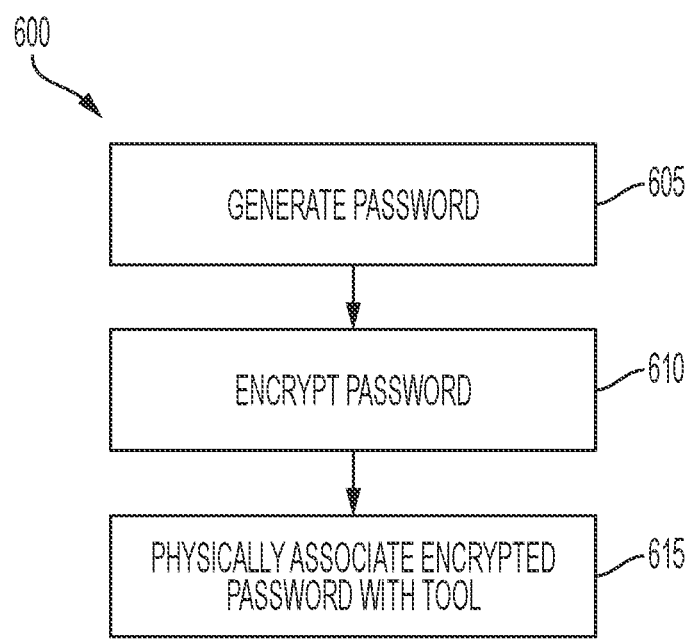
FIG. 6 shows a flowchart of a process for providing an encrypted password to a power tool.

FIG. 6 shows a flowchart of a process 600 for providing an encrypted password to a power tool (e.g., the power tool 102, 302). The process 600 can be implemented by an electronic controller that includes an electronic processor and memory, which may be part of the system 100 of FIG. 1. Within the system 100, the electronic controller may further be part of a server, personal computer, laptop, tablet, or the like. In some embodiments, the electronic controller is located at a manufacturing or distribution facility where the power tool is manufactured, assembled, shipped, or the like. In other words, in some embodiments, the process 600 may occur before the power tool arrives at a store for purchase by a customer or end user. Additionally, although the blocks of the process 600 are illustrated in a particular order, in some embodiments, one or more of the blocks can be executed partially or entirely in parallel, can be executed in a different order than illustrated in FIG. 6, or can be bypassed.

In block 605, the electronic controller obtains a password. For example, the electronic controller may include, implement, or be in communication with a random number generator that generates a pseudo-random alphanumeric character string to serve as the password. In some embodiments, the electronic controller obtains the password from a database or memory storing one or more available passwords. The password may include numeric characters, alphabetic characters, or a combination thereof. The password may be of a predetermined length or within a range of predetermined lengths.

In block 610, the electronic controller encrypts the password. For example, the electronic controller may include encryption software that receives the password in unencrypted form and outputs an encrypted version of the password. In some embodiments, the electronic controller (e.g., via the encryption software) encrypts the password using public-key cryptography, which includes encrypting the password with a public key according to known techniques. The public key (and password) may be associated with a private key, which, as described in further detail with respect to FIG. 7, may be used (e.g., by another device, such as a point-of-sale device) to decrypt the encrypted password.

In block 615, the electronic controller physically associates the password with the tool. For example, in some embodiments, the electronic controller physically associates the password with the tool by transmitting (wirelessly or via wired connection) the encrypted password to the power tool for storage in a memory of the power tool (e.g., the memory 230). Additionally, or alternatively, in some embodiments, the electronic controller physically associates the password with the tool by transmitting the encrypted password to a printing system (not shown) that prints the encrypted password. In such embodiments, the printed password may be printed on the tool itself, on a box or other packaging containing the power tool or physically secured to the power tool, or on a substrate (e.g., paper, laminate, etc.) that is attached (e.g., via an adhesive backing) to the tool, box or other packaging containing the tool. In some embodiments, the encrypted password is printed as an alphanumeric character string. Additionally, or alternatively, in some embodiments, the encrypted password is printed in an encoded format, such as a bar code, a QR code, or another graphic.

In some embodiments, the electronic controller also stores the unencrypted password in a memory of the tool. The power tool may later use this unencrypted password to determine whether a valid command is received from an external device (e.g., from a POS device 106) by comparing the encrypted password to a password received from the external device in conjunction with the command.

Figure 7:
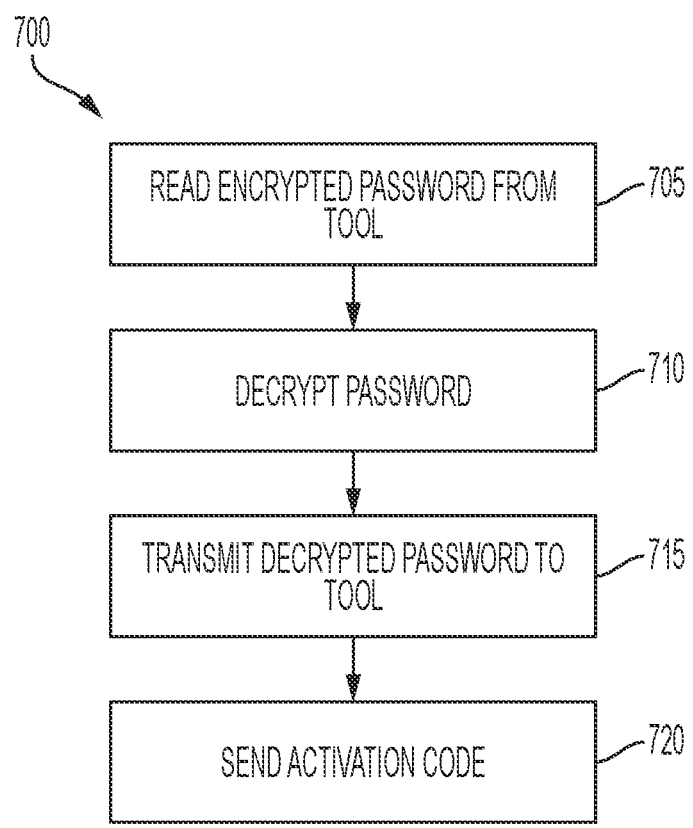
FIG. 7 shows a flowchart of another process for activating a power tool following a verified power tool purchase.
Figure 8:
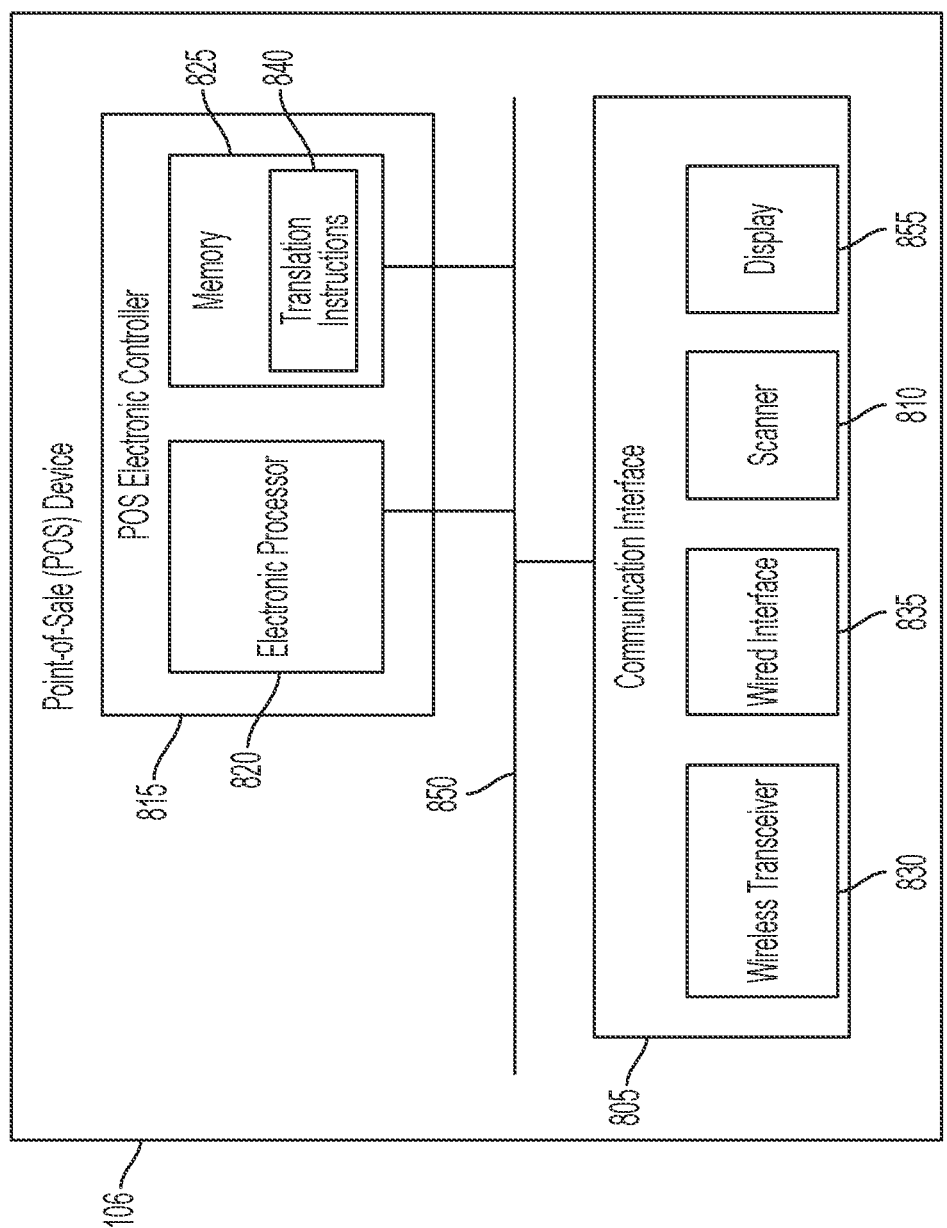
FIG. 8 illustrates an example of a point-of-sale (POS).

FIG. 7 shows a flowchart of a process 700 for activating a power tool (e.g., the power tool 102, 302) following a verified power tool purchase, which can be implemented using any of the systems described herein (e.g., the anti-theft system 100). However, in some embodiments, the process 700 can be implemented by another system having additional components, fewer components, alternative components, etc. Additionally, although the blocks of the process 700 are illustrated in a particular order, in some embodiments, one or more of the blocks can be executed partially or entirely in parallel, can be executed in a different order than illustrated in FIG. 7, or can be bypassed. For illustration purposes, the process 700 is generally described as being implemented by the POS device 106 in conjunction with power tool 102 (with or without the sled 104) in the context of the anti-theft system 100 in FIG. 1. However, the process 700 may also be executed by other devices, and/or in conjunction with the power tool 302 (with or without the sled 304). An example of the POS device 106 is also illustrated in FIG. 8 and described after the description of the process 700 in further detail.

In block 705, the POS device 106 obtains (or reads) the encrypted password from the power tool (e.g., the power tool 102). The POS device 106 may obtain or read the encrypted password from the power tool using various techniques and an input/output (I/O) interface 805 (see FIG. 8). For example, with reference to FIG. 8, the POS device 106 may use a scanner 810 (e.g., a barcode scanner) to scan or read the printed version of the encrypted password, which may be found on the tool or associated packaging, as described above with respect to block 615 of FIG. 6. An electronic controller 815 of the POS device 106 (e.g., including a processor 820 and a memory 825, also referred to as the POS controller 815) may be in communication with the scanner 810 of the POS device 106, and may receive the encrypted password from the scanner 810 and store the encrypted password in a memory of the POS device 106 (e.g., the memory 825). In another example, the POS device 106 communicates wirelessly via a wireless transceiver 830 with the power tool to read the encrypted password from a memory of the power tool (e.g., the memory 230), which may be previously stored in the memory as described above with respect to block 615 of FIG. 6. The POS controller 815 may be in communication with the transceiver 830 of the POS device 106, and may receive the encrypted password from the transceiver 830 and store the encrypted password in a memory of the POS device 106 (e.g., in the memory 825). In some examples, the wireless communication between the power tool 102 and the POS device 106 is directly between a transceiver 830 of the POS device 106 and a transceiver integrated into the power tool (e.g., part of the electronic controller 210 that communicates via antenna 240). In other examples, the wireless communication between the power tool 102 and the POS device 106 includes communication between the transceiver 830 of the POS device 106 and a transceiver (e.g., the communication system 310) of a sled (e.g., the sled 104 or 304) coupled to the power tool, which then communicates with an electronic controller 210 of the power tool via a wired connection (e.g., terminals) as described above (e.g., with respect to FIGS. 1-4). In another example, the POS device 106 communicates via a wired interface 835 with the power tool 102 to read the encrypted password from a memory of the power tool (e.g., the memory 230), which may be previously stored in the memory as described above with respect to block 615 of FIG. 6. The POS controller 815 may be in communication with the electronic controller of the power tool to receive the encrypted password, and may then store the encrypted password in a memory (e.g., the memory 825) of the POS device 106. For example, the POS device 106 may include an interfacing device that, similar to the sled 304, couples to and interfaces with the battery pack interface of the power tool (e.g., the battery pack interface 332).

In block 710, the POS device 106 decrypts the password. For example, the POS controller 815 may include decryption software (e.g., translation instructions 840) that, when executed, receives the password in encrypted form and outputs an unencrypted version of the password (e.g., the original version of the password created in block 605 of FIG. 6). In some embodiments, the POS controller 815 (e.g., via the decryption software) decrypts the password using public-key cryptography, which includes decrypting the password with a private key according to known techniques. Here, the password may have been previously encrypted using a public key that is associated with the private key (e.g., as described in block 610 of FIG. 6). The private key may have been provided to the POS device 106 (e.g., directly or indirectly by the electronic controller that implements the process 600 of FIG. 6) in advance of the process 700. The POS device 106 may have then stored the private key in a memory of the POS controller.

In block 715, the POS device 106 transmits the decrypted password to the tool. For example, the POS controller may transmit the decrypted password via a transceiver to the power tool or via a wired connection, such as described above with respect to some examples in block 705.

In block 720, the POS device 106 sends an activation code to the power tool using the I/O interface 805. The POS device 106 may transmit the activation code in parallel with the decrypted password, before transmitting the decrypted password, or after transmitting the decrypted password. In some examples, the activation code may be considered or represent an unlock command and the decrypted password may considered part of the unlock command. Regardless of the particular timing of transmission and receipt, the decrypted password may work in conjunction with the activation code to activate or unlock the power tool 102. For example, when the power tool 102 receives the activation code, the power tool (e.g., the electronic controller 210) may compare the decrypted password received in block 715 with a password previously stored in a memory of the power tool (e.g., as part of the process 600). When the electronic controller 210 determines that the received decrypted password matches the previously stored password, and in response to receiving the activation code, the electronic controller 210 may unlock the power tool. In contrast, when the electronic controller 210 determines that the received decrypted password does not match the previously stored password, the electronic controller 210 does not unlock the power tool in response to the activation code.

As described with respect to block 410 of the process 400, prior to the electronic controller 210 of the power tool receiving the unlock command, the power tool can be in a locked state, in which the power tool is unable to rotate, translate, or otherwise drive the actuator of the power tool. However, when the electronic controller 210 receives the unlock command from the POS device 106, the electronic controller of the power tool can switch states from the locked state to the unlocked state. In the unlocked state (e.g., when the power tool operates according to the unlocked state), the power tool can rotate, translate, or otherwise drive the actuator of the power tool, and can implement any other typical functions of the power tool (e.g., activating a light source of the power tool), as appropriate. In some embodiments, when the power tool operates according to the locked state, some (or all) of the functions of the power tool are prevented from being activated. For example, in the locked state, one or more of the electronic components 250 of the power tool 102 cease operation and/or are inhibited from operation (while the electronic controller may remain powered and enabled). In other words, in the locked state, one or more of the electronic components 250 of the power tool 102 are disabled from being operated by the electronic controller 210 of the power tool 102.

In some embodiments of the process 700, blocks 715 and 720 are executed by the POS device 106 in conjunction with a sled (e.g., the sled 304) connected to the power tool 102, in a similar manner as blocks 404-410 of the process 400. For example, the activation code of block 720 serves as the signal indicative of a valid purchase of the power tool 102, which causes the electronic controller of the power tool 102 to be powered. Then, the decrypted password of block 715 serves as the unlock command that is assessed by the power tool and, when correct (i.e., matches a password previously stored on the power tool), causes the power tool to unlock.

In some embodiments of the process 700, the password is not encrypted but, rather, is a unique identifier (e.g., serial number) associated with the power tool. The unique identifier may indicate one or more of a tool type, model, or manufacturing date of the power tool. Here, the decryption block 710 of the process 700 includes performing a hashing or similar function on the unique identifier. The output resulting from the function is then provided back to the power tool in block 715 and is used in a similar manner as the decrypted password as described above. For example, the electronic controller 210 of the power tool 102 may compare the output of the function to a previously stored value in a memory 230 of the power tool 102 that was generated in advance using the same function. Then, when the controller 210 determines that the comparison indicates a match, the electronic controller 210 causes the power tool 102 to enter an unlocked state. The hashing or similar function may be generally secret, similar to a private key, so that only the POS device 106 or other authorized devices can implement the function to activate the power tool after verifying a purchase.

Advantageously, the process 700 may be implemented without a real-time connection to an outside network (e.g., the Internet). That is, the private key or hashing function may be provided to the POS device 106 in advance of a sale of the tool. Then, at the time of the verified purchase, the POS device 106 may activate the power tool based on communications with just the tool itself, and without needing to communicate with an outside device or network. Thus, in the event of a network outage in which the POS device 106 loses a connection to the network, the process 700 may continue unaffected.

FIG. 8 illustrates an example of the point-of-sale (POS) device 106 in further detail. The POS device 106 includes the I/O interface 805, POS electronic controller 815, and a communication bus 850. The electronic processor 820, the memory 825, and the I/O interface 805 can communicate over one or more control buses, data buses, etc., which can include the communication bus 850. The electronic processor 820 can be configured to communicate with the memory 825 to store data and retrieve stored data. The electronic processor 820 can be configured to receive instructions and data from the memory 825 and execute, among other things, the instructions. In particular, the electronic processor 820 executes instructions stored in the memory 825. Thus, the electronic controller 815 coupled with the electronic processor 820 and the memory 825 can be configured to perform the methods described herein (e.g., the process 700 of FIG. 7).

The memory 825 can include read-only memory (ROM), random access memory (RAM), other non-transitory computer-readable media, or a combination thereof. The memory 825 can include translation instructions 840 for the electronic processor 220 to execute. The translation instructions 840 can include software executable by the electronic processor 820 to enable the electronic controller 815 to, among other things, translate a password. Translating the password may include encrypting an unencrypted password and/or decrypting an encrypted password (e.g., using known public-private key cryptography techniques or using known hashing techniques). The memory 825 may further include additional software or instructions to enable the electronic controller 815 to perform the other functions described herein as being performed by the electronic controller 815.

As described above, the I/O interface 805 enables the POS electronic controller 815 to provide output to other devices and/or users, to receive input from other devices and/or users, or both to provide output and to receive input. The other devices may be, for example, the sled 104, 204, the power tool 102, 302, and/or the device executing process 600. For example, the I/O interface 805 includes the wireless transceiver 830 to enable the POS device 106 to communicate wirelessly with the other devices and the wired interface 835 to communicate via wired connections with the other devices. The wireless communications may include Bluetooth communications, Wi-Fi communications, Zigbee communications, or the like. In some examples, the wireless transceiver 830 includes a radio frequency identifier (RFID) reader configured to read RFID tags (e.g., which may be secured to the power tool 102 and include a unique identifier for the power tool 102). The wired communications may include USB communications, Firewire communications, RG-485 communications, or the like. In some examples, the wired interface 835 includes terminals similar to the battery pack interface 242 to enable coupling to and communication with the sled 104, 304. The scanner 810 may include an optical scanner (e.g., barcode or QR code scanner), an imaging camera, or the like, that is configured to scan and digitize a printed code (e.g., a bar code, alphanumerical text). The scanner 810 may then output the digitized code to the electronic controller 210. In some examples, the I/O interface further includes a display 855, which may be a touch screen display, a keyboard, mouse, push-buttons, and the like, to enable interaction with a human user.

As described above, the POS device 106 is an example of a device that may execute the process 700 of FIG. 7. Further, although the process 700 of FIG. 7 is generally illustrated with respect to the example in which the POS device 106 obtains an encrypted password from a tool, decrypts the password, and transmits the decrypted password back to the tool, as noted, in some alternate examples of the process 700, the POS device 106 obtains an unencrypted password (e.g., unique identifier) from the tool (in block 705), encrypts the password in block 710), and transmits the encrypted password back to the tool (in block 715). Accordingly, in some examples, the blocks of the process 700 may also be described more generally, to encompass the illustrated example and the alternate example, as including the POS device 106 (e.g., the POS controller 815) reading a password from the power tool (e.g., whether encrypted or unencrypted) in block 705, performing a translation function on the password (e.g., whether decrypting or encrypting) in block 710, transmitting the translated password (e.g., whether encrypted or unencrypted) to the power tool in block 715, and transmitting the activation code to the power tool to, in conjunction with the translated password, unlock the power tool in block 720.

In some examples, the POS device 106 is further configured to process commercial transactions for a retail store. For example, the POS device 106 may scan products at the retail store to accessing a pricing database to determine a price, may receive payment details (e.g., credit card numbers, account numbers, or the like) for a customer purchasing the products, may communicate with third party services (e.g., banks, credit card companies, etc.) to facilitate the transaction, and provide an indication of a successful transaction (e.g., on the display 855 or as wireless or wired output). Such commercial translation functions may be implemented according to known point-of-sale techniques.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature can sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein.

Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions can be used to discuss aspects of a particular example or figure, but do not necessarily require similar orientation or geometry in all installations or configurations.

As used herein, unless otherwise defined or limited, the phase "and/or" used with two or more items is intended to cover the items individually and both items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A power tool system comprising: a power tool including:
　a body, a battery pack interface coupled to the body, and an electronic controller coupled to the body; and a sled configured to engage with the battery pack interface, the sled comprising a battery, a processor, a wireless module including transceiver circuitry and in communication with the processor, and a boost converter electrically connected to the battery, and
　wherein an output of the boost converter is configured to be electrically connected to the battery pack interface to provide a boosted voltage to the power tool.

2. The power tool system of claim 1, further comprising: a battery pack that includes multiple battery cells, wherein the battery pack is configured to engage with the battery pack interface in place of the sled.

3. The power tool system of claim 1, wherein the electronic controller is configured to be powered by a first nominal voltage and the battery has a second nominal voltage lower than the first nominal voltage.

4. The power tool system of claim 3, wherein the second nominal voltage of the battery is inadequate to directly power the electronic controller.

5. The power tool system of claim 1, wherein the processor is configured to:
　receive a first signal from a point-of-sale device indicative of a valid purchase of the power tool;
　and based on the first signal: cause the boost converter to output the boosted voltage to the power tool, thereby powering the electronic controller, and transmit an unlock command to the electronic controller to unlock the power tool.

6. The power tool system of claim 5, wherein the first signal is a wireless signal, and wherein transmitting the unlock command to the power tool includes:
　establishing a wired communication link between the sled and electronic controller via the battery pack interface; and transmitting the unlock command to the electronic controller via the wired communication link and the battery pack interface.

7. The power tool system of claim 6, wherein the wireless module is a Bluetooth wireless module, and wherein the first signal is a Bluetooth wireless signal.

8. The power tool system of claim 6, wherein the point-of-sale device is a wireless communication device.

9. The power tool system of claim 8, wherein the body of the tool includes a recess that includes the battery pack interface, wherein the recess is configured to receive the sled, and wherein the recess is configured to receive a portion of the battery pack.

10. The power tool system of The power tool system of wherein, when the sled is coupled to the battery pack interface, the recess is configured to receive the entire sled, and wherein, when the battery pack is coupled to the battery pack interface, the recess is configured to receive the portion of the battery pack while a second portion of the battery pack remains outside of the recess.

11. The power tool system of claim 1, wherein the battery pack interface includes a first power terminal, a second power terminal, a first communication terminal, and a second communication terminal, wherein the sled includes a third power terminal, a fourth power terminal, a third communication terminal, and a fourth communication terminal, and wherein when the sled electrically connects to the battery pack interface:
the first power terminal electrically connects to the third power terminal;
the second power terminal electrically connects to the fourth power terminal;
the first communication terminal electrically connects to the third communication terminal; and
the second communication terminal electrically connects to the fourth communication terminal.

12. The power tool system of claim 11, wherein the first power terminal, the second power terminal, the first communication terminal, and the second communication terminal each include a male connector, and wherein the third power terminal, the fourth power terminal, the third communication terminal, and the fourth communication terminal each include a female connector.

13. A sled comprising: a housing; a battery within the housing;
a wireless module within the housing; and a step-up voltage converter within the housing and electrically connected to the battery, wherein the sled is configured to engage with a battery pack interface of a power tool, and wherein an output of the step-up voltage converter is configured to be electrically connected to the battery pack interface to provide a boosted voltage to the power tool.

14. The sled of claim 13, further comprising a processor that is configured to: establish a wired communication link between the sled and an electronic controller of the power tool, via the battery pack interface; and transmit an unlock command to the electronic controller via the wired communication link and the battery pack interface.

15. The sled of claim 13, wherein when the sled is engaged with the battery pack interface of the power tool, the battery of the sled is the only electrical power source electrically connected to the power tool.

16. The sled of claim 13, wherein the sled communicates with the power tool via a wired communication link over the battery pack interface, and communicates with a point-of-sale device via a second wired communication link.

* * * * *

UNITED STATES PATENT AND TRADEMARK OFFICE
CERTIFICATE OF CORRECTION

| | | |
|---|---|---|
| PATENT NO. | : 12,131,339 B2 | Page 1 of 1 |
| APPLICATION NO. | : 18/693437 | |
| DATED | : October 29, 2024 | |
| INVENTOR(S) | : Anthony M. Davis et al. | |

It is certified that error appears in the above-identified patent and that said Letters Patent is hereby corrected as shown below:

In the Specification

Column 2, Line 59, "apiece" should be --a piece--.

Signed and Sealed this
Thirty-first Day of December, 2024

Derrick Brent
*Acting Director of the United States Patent and Trademark Office*